United States Patent
McNully et al.

(10) Patent No.: US 6,565,816 B1
(45) Date of Patent: May 20, 2003

(54) SADDLE STRUCTURE FOR REACTIVE DISTILLATION

(75) Inventors: Kenneth J. McNully, Atkinson, NH (US); Neil Yeoman, Merrick, NY (US); Matthew Buchholz, Wichita, KS (US)

(73) Assignee: Koch-Glitsch, Inc., Wichita, KS (US)

(*) Notice: Subject to any disclaimer, the term of this patent is extended or adjusted under 35 U.S.C. 154(b) by 794 days.

(21) Appl. No.: 08/881,969

(22) Filed: Jun. 25, 1997

(51) Int. Cl.[7] .............. B01F 3/00; B01J 35/00; B01J 35/02; B01J 35/10

(52) U.S. Cl. .............. 422/211; 261/75; 261/94

(58) Field of Search .............. 422/211; 261/75, 261/94

(56) References Cited

U.S. PATENT DOCUMENTS

| | | |
|---|---|---|
| 2,676,875 A | 4/1954 | Barr |
| 3,579,309 A | 5/1971 | Sennewald et al. |
| 4,089,752 A | 5/1978 | Hancock, II |
| 4,215,011 A | 7/1980 | Smith, Jr. |
| 4,250,052 A | 2/1981 | Smith, Jr. |
| 4,302,356 A | 11/1981 | Smith, Jr. |
| 4,303,600 A | 12/1981 | Roe, Jr. |
| 4,443,559 A | 4/1984 | Smith, Jr. |
| 4,471,154 A | 9/1984 | Franklin |
| 4,536,373 A | 8/1985 | Jones, Jr. |
| 4,624,748 A | 11/1986 | Haunschild |
| 4,731,229 A | 3/1988 | Sperandio |
| 4,847,431 A | 7/1989 | Nocca et al. |
| 5,013,407 A | 5/1991 | Nocca et al. |
| 5,026,459 A | 6/1991 | Quang et al. |
| 5,057,468 A | 10/1991 | Adams |
| 5,073,236 A | 12/1991 | Gelbein et al. |
| 5,108,550 A | 4/1992 | Pinaire et al. |
| 5,130,102 A | 7/1992 | Jones, Jr. |
| 5,536,699 A | 7/1996 | Ghelfi et al. |

FOREIGN PATENT DOCUMENTS

| | | |
|---|---|---|
| CA | 1042664 | 11/1978 |
| CA | 1048987 | 2/1979 |
| CA | 1051869 | 4/1979 |
| DE | 1075613 | 8/1960 |
| EP | 0008860 | 10/1985 |
| EP | 0332525 | 6/1989 |
| EP | 0334702 | 9/1989 |
| EP | 0402019 | 12/1990 |
| EP | 0448884 | 2/1991 |
| EP | 0417407 | 3/1991 |
| EP | 0458472 | 11/1991 |
| EP | 0461855 | 12/1991 |
| EP | 0466954 | 1/1992 |
| EP | 0470655 | 2/1992 |
| EP | 0476938 | 3/1992 |
| EP | 0396650 | 10/1992 |

Primary Examiner—Jerry D. Johnson
Assistant Examiner—Alexa A. Doroshenk
(74) Attorney, Agent, or Firm—Shook, Hardy & Bacon L.L.P.

(57) ABSTRACT

A hollow, saddle-shaped packing structure 14 includes a pair of porous outer and inner semi-cylindrical side walls 22, 34 that are spaced from one another to define an interior space 40, and a particulate catalyst component 20 retained in the interior space between the side walls. The packing structure may be formed by a pair of saddle-shaped shell elements 16, 18, each of which presents one of the side walls and a pair of radially opposed laterally extending flanges 26, 38. The flanges are connected together by tabs 30, 32, welding, or the like, and the interior space between axially spaced marginal edges 24, 36 of the outer and inner shell elements is closed off to retain the particulate catalyst component between the side walls.

13 Claims, 2 Drawing Sheets

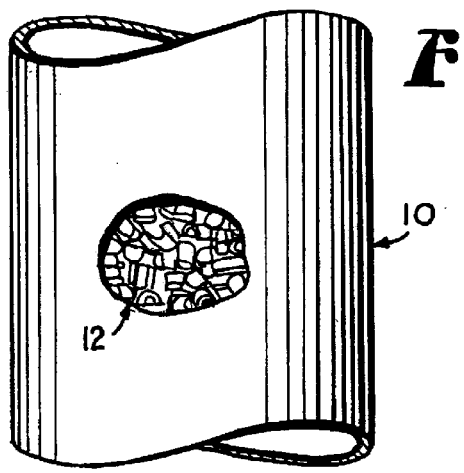
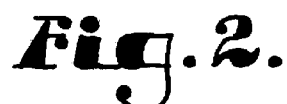
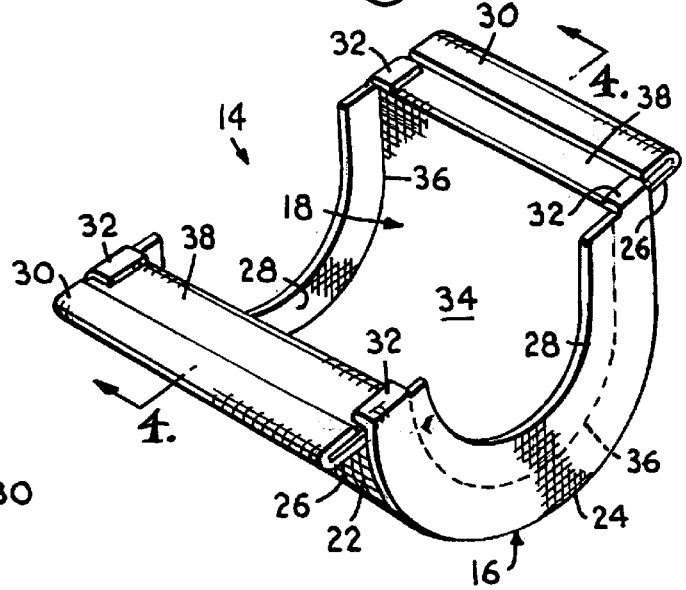
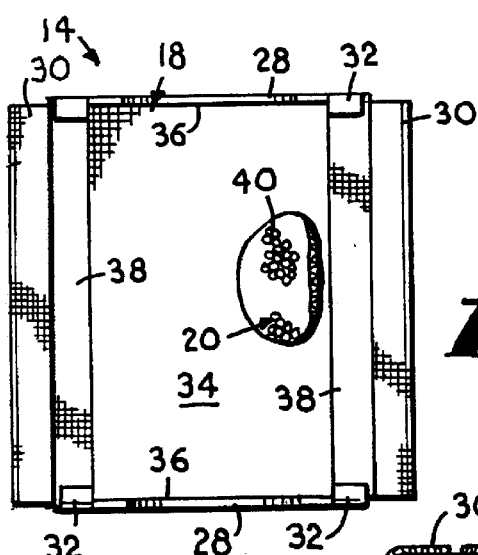
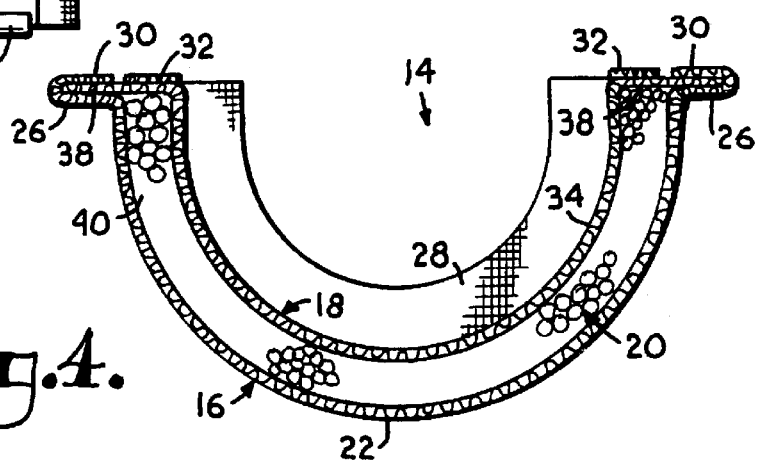

US 6,565,816 B1

SADDLE STRUCTURE FOR REACTIVE DISTILLATION

BACKGROUND OF THE INVENTION

The present invention relates generally to reactive distillation units in which a chemical reaction and distillation are carried out simultaneously, and more particularly to a random packing structure housing a particulate catalyst component.

It is known to provide a reactive distillation unit for simultaneously carrying out a chemical reaction and multistage distillation. Among the advantages recognized in the use of such units are the lower capital costs due to the requirement for less equipment than other conventional two-step processes, and lower operating costs due to the reaction proceeding under more favorable conditions than would otherwise be the case.

Any reaction system in which the preferred temperature range of the reaction either matches or substantially overlaps that for the distillation is potentially suited for reactive distillation. One particular type of system in which reactive distillation is beneficial is in the production of ethers such as methyl tert-butyl ether (MTBE), tert-amyl methyl ether (TAME) and ethyl tert-butyl ether (ETBE).

The shape of the packing structure used in a reactive distillation tower is a major variable in the performance of the system as the shape of the structure dictates the flow path tortuosity or effective length of the fluid path through the tower which in turn effects the pressure drop and the overall efficiency of the packing.

Several structures are known which provide acceptable conditions in various systems. For example, it is conventional to provide a structured packing having a solid catalyst component retained in screen envelopes so that the catalyst is exposed to a reacting liquid stream during use. It is also known to employ various shaped random packing structures that are provided with cavities within which solid catalyst components are retained for providing a reactive distillation structure for use in reactive distillation processes.

SUMMARY OF THE INVENTION

It is an object of the present invention to provide a hollow saddle-shaped packing structure that is filled with a particulate catalyst component such that the resulting structure can be employed in a reactive distillation process.

It is another object of the invention to provide a saddle-shaped packing structure that provides the benefits of known saddle-shaped random packing while at the same time providing a catalyst support system that allows a reacting phase to effectively access the catalyst so that the reaction can proceed to a high level of conversion.

In accordance with these and other objects evident from the following description. of a preferred embodiment of the invention, a hollow, saddle-shaped packing structure comprises a pair of porous outer and inner semi-cylindrical side walls that are spaced from one another to define an interior space, and a particulate catalyst component retained in the interior space between the side walls. In a preferred form of the invention, the structure includes outer and inner saddle-shaped shell elements that are connected together, wherein each element defines one of the side walls, and includes a pair of generally radially opposed, laterally extending flanges.

By providing an apparatus in accordance with the present invention, numerous advantages are realized. For example, in addition to obtaining the same benefits as are obtained by using saddle-shaped random packing structures in conventional distillation processes, the structure of the present invention also provides a means for supporting a solid catalyst component within the bed to simultaneously allow a chemical reaction to take place during distillation. In addition, the unique saddle shape of the structure permits the void volume of the packing to be varied by varying the size of saddle-shaped structures used in the packing; a feature that is not duplicated in the use of spherical or cylindrical random packing structures. As such, the capacity of the bed and the change of pressure experienced during a reactive distillation process can be adjusted to maximize the separation efficiency thereof.

BRIEF DESCRIPTION OF THE DRAWING

The preferred embodiment of the present invention is described in detail below with reference to the attached drawing figures, wherein:

FIG. 1 is a fragmentary side elevational view of a reactive distillation tower including a random packing made up of structures constructed in accordance with the preferred embodiment;

FIG. 2 is a bottom perspective view of a hollow saddle-shaped packing structure in accordance with a first construction of the preferred embodiment;

FIG. 3 is a top plan view of the packing structure of FIG. 2;

FIG. 4 is a sectional view of the packing structure taken along line 4—4 of FIG. 2;

DETAILED DESCRIPTION OF THE PREFERRED EMBODIMENT

Figure 5:
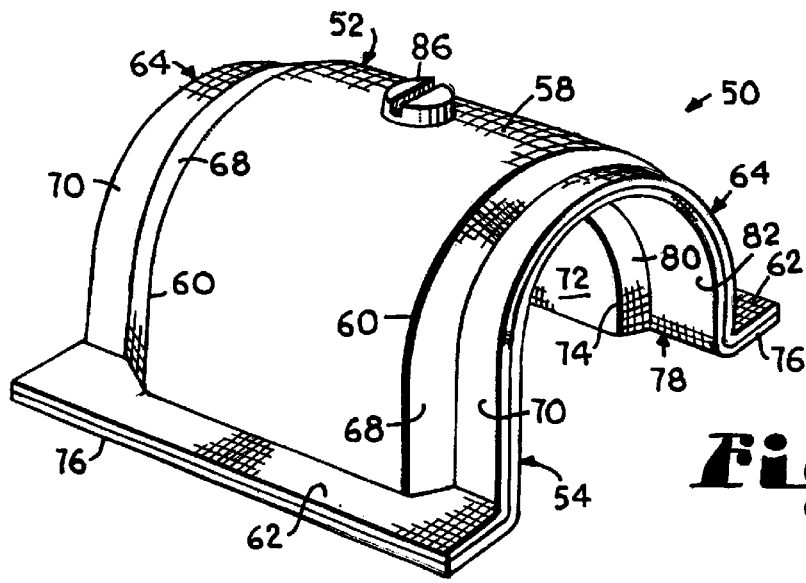
FIG. 5 is a top perspective view of a hollow saddle-shaped packing structure in accordance with a second construction of the preferred embodiment.

A reactive distillation tower is shown in FIG. 1, which is adapted for use with a random packing constructed in accordance with the preferred embodiment. The tower 10 is conventional, and includes a bed 12 within which random packing is provided, and vapor and liquid distributors positioned above and below the bed for introducing fluid for simultaneous distillation and chemical reaction.

A first hollow, saddle-shaped packing structure 14 constructed in accordance with the preferred embodiment is illustrated. in FIG. 2, and broadly includes outer and inner saddle-shaped shell elements 16, 18, and a particulate catalyst component 20, shown in FIG. 3.

Returning to FIG. 2, the outer shell element includes a porous, semi-cylindrical side wall 22 presenting axially spaced marginal edges 24, a pair of radially opposed, laterally extending flanges 26, and a pair of axially opposed, radially extending end walls 28. Each flange 26 defines a primary tab 30, and secondary tabs 32 are provided on the circumferential ends of each of the end walls.

The outer shell element can be formed of any desired material or combination of materials capable of maintaining the saddle shape of the structure and retaining the particulate catalyst component. For example, the shell element can be made of metal, a synthetic resin or a ceramic. Suitable metals would include carbon steel, stainless steels, aluminum alloys, titanium, nickel, and nickel alloys, among others. Among the resins suitable for use in the outer shell element are polypropylene, glass fiber reinforced polypropylene, PFA polytetrafluoroethylene (PTFE), liquid crystalline Polymer (LCP), and other moldable resins. Both chemical stoneware and chemical porcelain represent exemplary ceramics capable of use in the outer shell element.

The inner shell element may be formed of any of the same materials listed above for use in the outer shell element, and is preferably formed of the same material as the outer element. As shown in FIG. 3, the inner shell element includes a porous, semi-cylindrical side wall 34 presenting axially spaced marginal edges 36, and a pair of radially opposed, laterally extending flanges 38. The side wall is of a length slightly less than the length of the outer side wall so that the inner element can be received within the outer element between the end walls, as shown in FIG. 2. In addition, as illustrated in FIG. 4, the radius of the inner side wall is less than the radius of the outer side wall so that when the two elements are assembled, an interior space 40 is defined within which the particulate catalyst component is received.

As with the flanges 26 of the outer shell element, the flanges 38 of the inner shell element 18 are radially opposed to one another and extend laterally from the inner side wall 34. However, because the inner side wall is of a smaller radius than the outer side wall 22, the inner flanges are not coextensive with the outer flanges, leaving a portion of the width of each outer flange to function as one of the primary tabs 30 that can be bent over the corresponding inner flange to secure the outer and inner shell elements together during assembly. The inner flanges 38 also function to close off the interior space 40 along the sides of the structure between the outer and inner shell elements, retaining the particulate catalyst component 20 within the structure 14.

The spacing of the side walls 22, 34 from one another may vary depending on the type and size of catalyst to be used. However, in the illustrated embodiment, the structure includes an outer shell element presenting a side wall having a diameter of 2 inches and a length of 2 inches, and the spacing between the outer and inner side walls is 3/16 inches. Sizes may range from an outer shell diameter of less than ½ inches to more than 3 inches, again depending on the particular application in which the structure is to be used.

The particulate catalyst component 20 of the structure is conventional, and includes a particle size sufficient to be retained in the structure during use in a reactive distillation process. For example, in the illustrated embodiment, the outer and inner side walls 22, 34 are formed of a stainless steel screen including 35 longitudinal and 35 lateral wires per square inch of the screen, with the diameter of each wire being 0.012 inches in diameter. The size of the resulting openings in the screens should be smaller than the size of the particulate catalyst so that the catalyst is retained in the structure within easy access of the reactive fluid. At the same time that the shell elements support the catalyst component within the bed, they also present substantial surface area for mass transfer, thus facilitating both the chemical reaction and distillation.

During assembly, the outer and inner shell elements are positioned relative to one another with the particulate catalyst component sandwiched between the side walls 22, 34, and the primary and secondary tabs 30, 32 are folded over onto the inner flanges 38 to secure the elements together. The interior space 40 is thus defined by the side walls 22, 34, the inner flanges 38, and the end walls 28 of the outer element 16, preventing any of the catalyst component from pouring from the structure. Although it is only necessary that the side walls 22, 34 be porous, it is preferred that at least the inner flanges 38 and the end walls 28 of the outer element also be porous, and it is possible that the entire outer and inner shell elements 16, 18 be formed of a porous material. By employing such a construction, the cost of the structure is reduced relative to a more complex construction combining materials in a composite construction.

Figure 7:
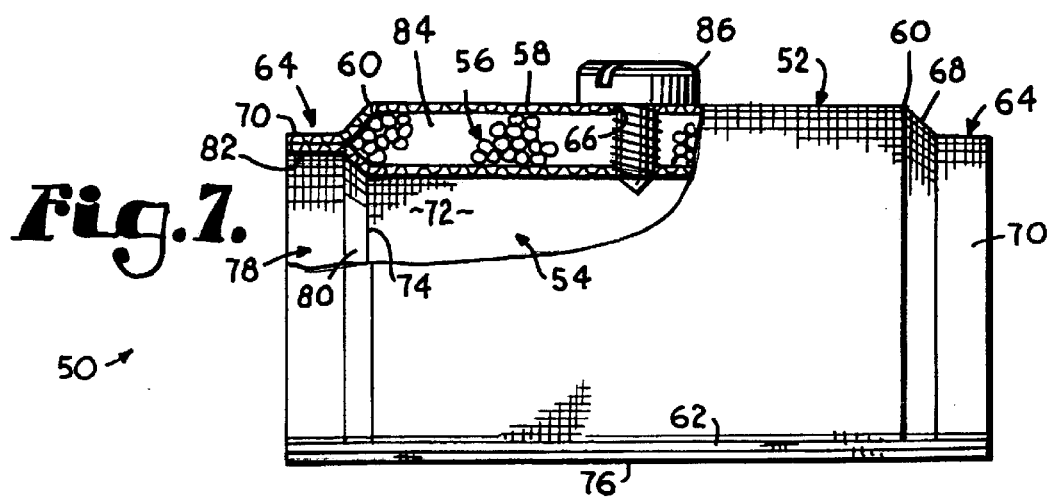
FIG. 7 is a side elevational view of the packing structure of FIG. 5, partially broken away to illustrate a siculecatal view part of the structure.

A second hollow, saddle-shaped packing structure 50 constructed in accordance with the preferred embodiment is illustrated in FIG. 5, and broadly includes outer and inner saddle-shaped shell elements 52, 54, and a particulate catalyst component 56, shown in FIG. 7.

Returning to FIG. 5, the outer shell element 52 includes a porous, semi-cylindrical side wall 58 presenting axially spaced marginal edges 60, a pair of radially opposed, laterally extending flanges 62, and a pair of axially opposed end walls 64. As shown in FIG. 7, a fill opening is formed centrally in the outer side wall, and presents a means for filling the structure with the particulate catalyst component 56 during assembly. Each of the end walls 64 includes a tapered portion 68 connected to the adjacent marginal edge of the side wall, and a cylindrical portion 70 protruding from the tapered portion. The outer and inner shell elements can be formed of any desired material or combination of materials capable of maintaining the saddle shape of the structure and retaining the particulate catalyst component, as described above with reference to the first structure.

The inner shell element 54 includes a porous, semi-cylindrical side wall 72 presenting axially spaced marginal edges 74, a pair of radially opposed, laterally extending flanges 76, and a pair of axially opposed end walls 78. Each of the end walls includes a tapered portion 80 connected to the adjacent marginal edge of the side wall, and a cylindrical portion 82 protruding from the tapered portion. The inner side wall is of the same length as the outer side wall so that the cylindrical portions of the outer and inner end walls engage one another at each end of the structure and can be fastened together, e.g. by welding or through the use of fasteners. In addition, as shown in FIG. 6, the radius of the inner side wall is less than the radius of the outer side wall so that when the two elements 52, 54 are assembled, an interior space 84 is defined within which the particulate catalyst component 56 is received, as shown in FIG. 7.

Figure 6:
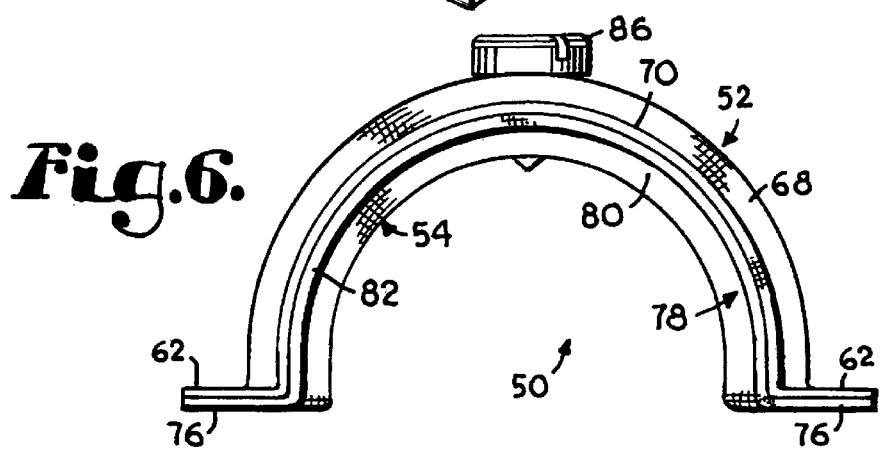
FIG. 6 is an end elevational view of the packing structure of FIG. 5.

Turning to FIG. 6, the flanges 76 of the inner shell element 54 are radially opposed to one another and extend laterally from the inner side wall. However, because the inner side wall is of a smaller radius than the outer side wall, the inner flanges 76 are formed of a greater width to be coextensive with the outer flanges, allowing the mated edges of the outer and inner flanges to be fastened together by welding or the like. The inner flanges also function to close off the interior space along the sides of the structure between the outer and inner shell elements, retaining the particulate catalyst within the structure.

The spacing of the side walls from one another may vary depending on the type and size of catalyst to be used. However, in the illustrated embodiment, the structure includes an outer shell element presenting a side wall having a diameter of 2 inches and a length of 2 inches, and the spacing between the outer and inner side walls is 3/16 inches. Sizes may range from an outer shell diameter of less than ½ inches to more than 3 inches, again depending on the particular application in which the structure is to be used.

As with the first structure, the particulate catalyst component of the second structure is conventional, and includes a particle size sufficient to be retained in the structure during use in a reactive distillation process. For example, in the illustrated embodiment, the outer and inner side walls are formed of a stainless steel screen including 35 longitudinal and 35 lateral wires per square inch of the screen, with the diameter of each wire being 0.012 inches in diameter. The size of the particulate catalyst is selected to be larger than the resulting openings in the screens so that the catalyst is retained in the structure within easy access of the reactive fluid.

During assembly, the outer and inner shell elements 52, 54 are positioned relative to one another and the outer and inner flanges 62, 76, as well as the cylindrical portions 70, 82 of the outer and inner side walls 58, 72, form a continuous lip around the mating edges of the outer and inner elements 52, 54. This lip is then welded or otherwise fastened shut. The interior space 84 is thus defined by the outer and inner side walls the inner flanges, and the outer and inner end walls, as shown in FIG. 7, preventing any of the catalyst component from pouring from the structure. Thereafter, the catalyst component 56 is poured into the interior through the fill opening 66, and the opening is closed by threading a closure member 86 into place. Although it is only necessary that the side walls 58, 72 be porous, it is preferred that at least the inner flanges 76 and the end walls 64, 78 also be porous, and it is possible that the entire outer and inner shell elements 52 54 be formed of a porous material. By employing such a construction, the cost of the structure is reduced relative to a more complex construction combining materials in a composite construction.

Although the present invention has been described with reference to the preferred embodiment, it is noted that equivalents may be employed and substitutions made herein without departing from the scope of the invention as recited in the claims.

What is claimed is:

1. A hollow, saddle-shaped packing structure comprising:
   an outer saddle-shaped shell element including a porous outer semi-cylindrical side wall and a pair of generally radially opposed, laterally extending outer flanges, the outer side wall presenting a pair of axially opposed, circumferentially extending marginal edges;
   an inner saddle-shaped shell element including a porous inner semi-cylindrical side wall and a pair of radially opposed, laterally extending inner flanges, the inner side wall presenting a pair of axially opposed, circumferentially extending marginal edges;
   a means for securing the outer and inner flanges together;
   a means for closing off the interior space between the marginal edges of the outer and inner shell elements;
   the outer and inner side walls being spaced from one another to define an interior space; and
   a particulate catalyst component retained in the interior space between the side walls.

2. A packing structure as recited in claim 1, wherein the outer and inner shell elements are formed of metal.

3. A packing structure as recited in claim 1, wherein the outer and inner shell elements are formed of a synthetic resin.

4. A packing structure as recited in claim 1, wherein the outer and inner shell elements are formed of a ceramic.

5. A packing structure as recited in claim 1, wherein the means or securing the outer and inner flanges together includes a plurality of tabs that are formed on at least two of the flanges and deformed to pinch the flanges together.

6. A packing structure as recited in claim 1, wherein the means for securing the outer and inner flanges together includes a welding connection between the outer and inner flanges.

7. A packing structure as recited in claim 1, wherein the means for closing off the interior space between the marginal edges of the outer and inner shell elements includes a pair of axially spaced end walls connected to the marginal edges of the outer shell element and extending radially inward beyond the marginal edges of the inner shell element.

8. A packing structure as recited in claim 7, wherein the end walls are porous.

9. A packing structure as recited in claim 7, wherein the means for securing the outer and inner flanges together includes a plurality of tabs that are formed on the end walls and deformed to pinch the flanges together.

10. A packing structure as recited in claim 1, wherein the means for closing off the interior space between the marginal edges of the outer and inner shell elements includes a pair of axially spaced outer end walls connected to the marginal edges of the outer shell element and a pair of axially spaced inner end walls connected to the marginal edges of the inner shell element, the outer and inner end walls being connected together to close off the interior space.

11. A packing structure as recited in claim 1, further comprising a fill opening through which the particulate catalyst component is filled into the interior space, and a closure member for closing the fill opening to prevent the particulate catalyst component from pouring through the fill opening from the interior space.

12. A packing structure as recited in claim 11, wherein the closure member is threaded.

13. A saddle packing structure comprising:
   an outer saddle-shaped shell element including a porous, semi-cylindrical screen defining an outer side wall;
   an inner saddle-shaped shell element connected to the outer shell element and including a porous, semi-cylindrical screen defining an inner side wall that is spaced from the outer side wall to define an interior space;
   a pair of axially opposed end walls for closing off the interior space between the side walls of the outer and inner shell elements; and
   a particulate catalyst component retained in the interior space between the side walls of the outer and inner shell elements.

\* \* \* \* \*

UNITED STATES PATENT AND TRADEMARK OFFICE
CERTIFICATE OF CORRECTION

PATENT NO. : 6,565,816 B1
DATED : May 20, 2003
INVENTOR(S) : Kenneth J. McNulty et al.

It is certified that error appears in the above-identified patent and that said Letters Patent is hereby corrected as shown below:

<u>Title page,</u>
Item [75], Inventors, replace "Kenneth J. McNully, Atkinson, NH (US)" with
-- Kenneth J. McNulty, Atkinson, NH (US) --

Signed and Sealed this

Sixteenth Day of September, 2003

JAMES E. ROGAN
*Director of the United States Patent and Trademark Office*